United States Patent
Kitada et al.

(10) Patent No.: US 6,465,592 B1
(45) Date of Patent: Oct. 15, 2002

(54) PROCESS FOR PREPARING VINYLPYRROLIDONE POLYMER

(75) Inventors: Akira Kitada, Shiga (JP); Keiichi Fujise, Shiga (JP); Itsuko Hamaguchi, Kyoto (JP)

(73) Assignee: Dai-Ichi Kogyo Seiyaku Co., Ltd., Kyoto (JP)

( * ) Notice: Subject to any disclaimer, the term of this patent is extended or adjusted under 35 U.S.C. 154(b) by 0 days.

(21) Appl. No.: 09/890,763

(22) PCT Filed: May 23, 2001

(86) PCT No.: PCT/JP01/04308

§ 371 (c)(1), (2), (4) Date: Aug. 3, 2001

(87) PCT Pub. No.: WO01/96423

PCT Pub. Date: Dec. 20, 2001

(30) Foreign Application Priority Data

Jun. 15, 2000 (JP) .......................................... 2000-180309
Oct. 31, 2000 (JP) .......................................... 2000-332582

(51) Int. Cl.$^7$ .................................................. C08F 26/08
(52) U.S. Cl. .................... 526/264; 526/258; 526/260; 526/222; 526/227; 526/230; 526/236
(58) Field of Search ............................. 526/222, 227, 526/230, 236, 258, 260, 264

(56) References Cited

U.S. PATENT DOCUMENTS

| | | | |
|---|---|---|---|
| 4,795,802 A | | 1/1989 | Nuber et al. |
| 5,262,171 A | * | 11/1993 | Login et al. ................. 424/465 |
| 5,354,945 A | | 10/1994 | Detering et al. |
| 5,506,315 A | * | 4/1996 | Meyer et al. ................. 526/89 |
| 5,773,545 A | * | 6/1998 | Schade et al. ............... 526/262 |
| 6,025,317 A | * | 2/2000 | Stein et al. ................. 510/360 |
| 6,103,820 A | * | 8/2000 | Blankenburg et al. ....... 524/767 |
| 6,132,705 A | * | 10/2000 | Schehlmann et al. .... 424/78.02 |

FOREIGN PATENT DOCUMENTS

| | | |
|---|---|---|
| JP | 6-192993 | 7/1994 |
| JP | 7-206945 | 8/1995 |
| JP | 9-110933 | 4/1997 |

OTHER PUBLICATIONS

International Search Report (Japanese language) for PCT/JP01/04308 dated Jul. 3, 2001.

* cited by examiner

Primary Examiner—Helen L. Pezzuto
(74) Attorney, Agent, or Firm—Sughrue Mion, PLLC

(57) ABSTRACT

A vinylpyrrolidone polymer which is little colored, gives off a bad smell little, and contains extremely little impurities is provided. The polymerization is performed by adding a water-soluble organic peroxide and a sulfite to a vinylpyrrolidone aqueous solution.

13 Claims, No Drawings

US 6,465,592 B1

PROCESS FOR PREPARING VINYLPYRROLIDONE POLYMER

TECHNICAL FIELD

The present invention relates to a process for preparing a vinylpyrrolidone polymer, wherein a specific redox initiator is employed. Particularly, the present invention relates to a process for preparing a vinylpyrrolidone polymer which is not colored, does not give off a bad smell, and contains extremely little impurities (for example, remaining monomers or by-products).

BACKGROUND ART

One of the conventional processes for polymerization of vinylpyrrolidone is a process using aqueous hydrogen peroxide as an initiator (DE-B922378). However, when the process is employed, pH control is required during the polymerization. The process also has problems that 2-pyrrolidone is produced as a by-product in proportion to the amount of hydrogen peroxide (Polymer Journal, vol. 17, No. 1, pp143–152 (1985)), or that products are colored. The above process is effective for preparing a vinylpyrrolidone polymer having a low molecular weight, but because products are colored, another process has been expected especially for a cosmetic use.

The process using azo compounds as an initiator is disclosed (Japanese Unexamined Patent Publication No. 38403/1989). Even by the process, impurities derived from the initiator remain in products, and therefore the process is not useful for a cosmetic use.

The process using a redox initiator consisting of a peroxide and Rongalit is disclosed (Japanese Unexamined Patent Publication No. 215302/1984). It is predicted in the process that a bad smell will be caused because aldehyde remains as an impurity in products. Therefore, the process seems inappropriate for a cosmetic use.

The process using di-tert-butyl peroxide singly as an initiator is also disclosed (Japanese Examined Patent Publication No. 19174/1996). However, polymerization requires to be carried out at 100° C. or more under a pressurized condition because the decomposition temperature of di-tert-butyl peroxidede is high.

DISCLOSURE OF THE INVENTION

It is an object of the present invention to provide a vinylpyrrolidone polymer which is little colored, gives off a bad smell little, and contains extremely little impurities.

The present invention relates to a process for preparing a vinylpyrrolidone polymer, wherein a water-soluble organic peroxide and a sulfite are added to a vinylpyrrolidone aqueous solution to polymerize vinylpyrrolidone, and to obtain a vinylpyrrolide polymer.

The present invention relates to the above-mentioned process for preparing a vinylpyrrolidone polymer, wherein a K value of the resulting vinylpyrrolidone polymer evaluated according to Fikentscher method is 10 to 120.

The present invention relates to each of the above-mentioned processes for preparing a vinylpyrrolidone polymer, wherein the water-soluble organic peroxide is added in an amount of 0.005 to 5% by weight and the sulfite is added in an amount of 0.005 to 10% by weight based on the vinylpyrrolidone.

The present invention relates to each of the above-mentioned processes for preparing a vinylpyrrolidone polymer, wherein the mole ratio of the water-soluble organic peroxide and the sulfite is 1:0.5 to 1:20.

The present invention relates to each of the above-mentioned processes for preparing a vinylpyrrolidone polymer, wherein the water-soluble organic peroxide and the sulfite are added to the reaction solution in installments for the polymerization.

The present invention relates to each of the above-mentioned processes for preparing a vinylpyrrolidone polymer, wherein the amount of the sulfite added initially is determined so that the mole ratio of the vinylpyrrolidone and the amount of the sulfite added initially is 1:0.0004 to 1:0.1.

The present invention relates to each of the above-mentioned processes for preparing a vinylpyrrolidone polymer, wherein the polymerization temperature of vinylpyrrolidone is 10 to 90° C.

The present invention relates to each of the above-mentioned processes for preparing a vinylpyrrolidone polymer, wherein the sulfite is ammonium sulfite.

The present invention relates to each of the above-mentioned processes for preparing a vinylpyrrolidone polymer, wherein the water-soluble organic peroxide is a hydroperoxide.

The present invention relates to each of the above-mentioned processes for preparing a vinylpyrrolidone polymer, wherein the water-soluble organic peroxide is tert-butyl hydroperoxide.

The present invention relates to each of the above-mentioned processes for preparing a vinylpyrrolidone polymer, wherein at most 10 ppm of vinylpyrrolidone is contained in the resulting vinylpyrrolidone polymer.

The present invention relates to a vinylpyrrolidone polymer containing a little amounts of vinylpyrrolidone, which is obtained by adding a water-soluble organic peroxide and a sulfite to a vinylpyrrolidone aqueous solution to polymerize vinylpyrrolidone.

The present invention relates to the above-mentioned vinylpyrrolidone polymer which contains at most 10 ppm of vinylpyrrolidone based on the vinylpyrrolidone polymer.

The present invention relates to a vinylpyrrolidone polymer, which has a K value evaluated according to Fikentscher method of 10 to 40, and Hazen No. (APHA) value in a 10% aqueous solution according to JIS K3331 of at most 10, and which contains at most 10 ppm of remaining vinylpyrrolidone based on the vinylpyrrolidone polymer.

BEST MODE FOR CARRYING OUT THE INVENTION

In the process for preparing a vinylpyrrolidone polymer of the present invention, a vinylpyrrolidone polymer is prepared by adding a water-soluble organic peroxide and a sulfite as a redox initiator to a vinylpyrrolidone (hereinafter referred to as "VP") aqueous solution to initiate the polymerization.

Vinylpyrrolidone (VP) ordinarily means N-vinyl-2-pyrrolidone. A vinylpyrrolidone polymer implies a VP homopolymer and a copolymer consisting of VP and other monomers (the copolymer contains preferably at least 20% by weight, more preferably at least 30% by weight of VP units).

As other monomers, for example, acrylic acid, methacrylic acid, an alkylester of acrylic acid (for example, methyl acrylate and ethyl acrylate), an alkylester of methacrylic acid (for example, methyl methacrylate and ethyl methacrylate), an aminoalkylester of acrylic acid (for example, diethylaminoethyl acrylate), an aminoalkylester of methacrylic acid, a monoester of acrylic acid and a glycol, a monoester of methacrylic acid and a glycol (for example, hydroxyethyl methacrylate), an alkaline metal salt of acrylic acid, an alkaline metal salt of methacrylic acid, ammonium salt of acrylic acid, ammonium salt of methacrylic acid, a quaternary ammonium derivative of an aminoalkylester of acrylic acid, a quaternary ammonium derivative of an aminoalkylester of methacrylic acid, a quaternary ammonium compound of diethylaminoethylacrylate and methyl sulfate, vinyl methyl ether, vinyl ethyl ether, an alkaline metal salt of vinyl sulfonic acid, ammonium salt of vinyl sulfonic acid, styrene sulfonic acid, a styrene sulfonate, an allylsulfonic acid, an allyl sulfonate, methallylsulfonic acid, methallyl sulfonate, vinyl acetate, vinyl stearate, N-vinylimidazol, N-vinylacetamide, N-vinylformamide, N-vinylcaprolactam, N-vinylcarbazole, acrylamide, methacrylamide, N-alkylacrylamide, N-methylolacrylamide, N,N-methylenebisacrylamide, a glycol diacrylate, a glycol dimethacrylate, divinylbenzene, a glycol diallylether, and the like are employed.

Polymerization of VP or copolymerization of VP and other monomers can be carried out according to a solution polymerization in an aqueous solvent. For example, the polymerization can be carried out by adding an aqueous solution of a water-soluble organic peroxide and an aqueous solution of a sulfite to a VP aqueous solution.

As the VP aqueous solution, for example, an aqueous solution having a VP concentration of 10 to 60%, preferably 20 to 50% by weight can be used. When an aqueous solution containing VP and other monomers is employed as the VP aqueous solution, the aqueous solution is 10 to 60% by weight, preferably 20 to 50% by weight in total concentration of VP and other monomers. When the concentration of the VP aqueous solution is low, a low productivity and high cost tend to be caused. When the concentration of the VP solution is high, a trouble in the reaction tends to be caused, because viscosity becomes high with passage of time during polymerization, and stirring becomes difficult.

As the organic peroxide, a water-soluble organic peroxide is preferable because the polymerization system of the present invention is an aqueous system and the sulfite as a reductant in the redox initiator is water-soluble.

As the water-soluble organic peroxide, for example, any hydroperoxides such as tert-butyl hydroperoxide, cumene hydroperoxide, tert-hexyl hydroperoxide and p-menthane hydroperoxide, and a water-soluble peroxyester such as tert-butyl peroxyacetate can be employed. tert-Butyl hydroperoxide is preferable because in case of employing tert-butyl hydroperoxide as an initiator by-products such as tert-butanol can be removed easily by heating at less than 100° C., or by decompressing.

A water-soluble organic peroxide is added in an amount of preferably 0.005 to 5%, more preferably 0.02 to 3% by weight based on VP. When a water-soluble organic peroxide is added in a small amount, the polymerization rate tends to decrease causing a low productivity. And when added in a large amount, the peroxide remains as impurities after polymerization, which is not preferable in a product quality, and tends to cause trouble in preparation of a polymer having a relatively high molecular weight.

The water-soluble organic peroxide may be added in a form of a solid or an aqueous solution.

As the sulfite, for example, an ammonium salt of a sulfurous acid comprising sulfurous acid, thiosulfurous acid, hyposulfurous acid and metasulfurous acid and the like, an alkaline metal salt thereof (for example, a sodium salt or a potassium salt thereof), an alkaline earth metal salt thereof (for example, a magnesium salt or a calcium salt thereof) can be employed. Among those mentioned above, ammonium sulfite is more preferable because does not turn into an ash content and can be removed easily for the reason of its high volatility.

The sulfite is added in an amount of preferably 0.005 to 10% by weight, more preferably 0.02 to 7% by weight based on VP. When the sulfite is added in a small amount, a high polymerization ratio becomes difficult to be obtained and non-reacting monomers tend to remain in a large amount. And when added in a large amount, the sulfite or the oxide thereof, i.e. sulfate, tend to remain in products.

The sulfite can be added to a VP aqueous solution, for example, in a form of an aqueous solution.

The mole ratio of the water-soluble organic peroxide and the sulfite is preferably 1:0.5 to 1:20, more preferably 1:1 to 1:10 so that the water-soluble organic peroxide does not remain in products.

The above-mentioned polymerization initiator may be added after or before the temperature of the above-mentioned VP aqueous solution is adjusted to a polymerization temperature.

The above-mentioned polymerization initiator can be added to a reaction solution, for example, collectively or in installments. By adding a polymerization initiator to a reaction solution in installments, for example, a desired and small molecular weight of vinylpyrrolidone polymer can be obtained, and remaining monomers (VP) can be decreased in the resulting vinylpyrrolidone polymer.

When the polymerization initiator is added in installment, by determining the amount of a sulfite added initially so that the mole ratio of the monomer (VP) and the sulfite is 1:0.0004 to 1:0.1, preferable 1:0.005 to 1:0.1, for example, a desired and small molecular weight of a vinylpyrrolidone polymer (K value thereof is 10 to 40) can be obtained. Further, by determining the amount of the sulfite added initially so that the mole ratio of the monomer (VP) and the sulfite is 1:0.0004 to 1:0.08, preferably 1:0.005 to 1:0.08, a desired and small molecular weight of a vinylpyrrolidone polymer (K value thereof is 20 to 40) can be obtained.

The polymerization temperature is preferably 10 to 90° C. When the polymerization temperature is low, the polymerization rate and the productivity tend to lower. When the polymerization temperature is high, the radical concentration in the reaction system tends to become high accelerating a termination reaction, and the initiator tends to be used ineffectively and required in a large amount.

The polymerization reaction is almost completed in 0.5 to 10 hours.

According to the present invention, pH control is not necessary during the polymerization in contrast with the case hydrogen peroxide is employed as an initiator. According to the present invention, for example, a vinylpyrrolidone polymer having a K value of 10 to 120 can be obtained.

A K value according to Fikentscher method is a value which represents a molecular weight, and can be evaluated by the means as follows. If the K value is less than 20, a viscosity of the 5% (g/100 ml) aqueous solution is measured. If the K value is at least 20, a viscosity of the 1% (g/100 ml) aqueous solution is measured. The concentration of the sample is calculated based on dry substances thereof. If the K value is at least 20, 1.0 g of the sample is measured precisely, and put into a measuring flask having a capacity of 100 ml. Then, distilled water is added thereto at room temperature to dissolve the sample completely with shaking, and distilled water is added additionally thereto in total 100 ml precisely. Thirty minutes after the resulting sample solution is left to stand in a thermostat (25±0.2° C.), a measurement with Ubbelohde viscometer is carried out.

The time required for the sample solution to flow between two of marked lines is measured. The mean is calculated by repeating the measurement several times. Measurement of distilled water is carried out similarly in order to provide a relative viscosity. Two of the resulting flow time are corrected based on a correction value according to Hagenbach-Couette.

$$K \text{ value} = \frac{\sqrt{300C\log Z + (C + 1.5C\log Z)^2} + 1.5C\log Z - C}{0.15C + 0.003C^2}$$

In the above formula, Z is a relative viscosity ($\eta$ rel) at concentration C, and C is a concentration of a sample (%: g/100 ml).

The relative viscosity $\eta$ rel is calculated according to the formula as follows.

$\eta\text{rel}=$(the flow time of the solution)/(the flow time of water)

According to the present invention, a vinylpyrrolidone polymer which is little colored, gives off a bad smell little, and contains little impurities, especially, the remaining monomer (VP) in vinylpyrrolidone polymers (for example, contains at most 10 ppm) can be obtained. For example, a vinylpyrrolidone polymer which has 10 to 40 of a K value and at most 10 of APHA of a 10% solution and contains at most 10 ppm of remaining monomers (VP) can be obtained.

The resulting vinylpyrrolidone polymer aqueous solution can be converted into solid powders by general means, for example, spray drying, freeze drying, fluidized bed drying, drum drying or belt drying.

The present invention is more specifically described and explained by means of the following Examples, but it is to be understood that the invention is not limited to only these Examples.

(Process for Preparation)

EXAMPLE 1

Sixty grams of N-vinyl-2-pyrrolidone (hereinafter referred to as "VP") and 240 g of water were introduced in a separable flask having a capacity of 500 ml, and deoxygenation was carried out by blowing nitrogen thereinto for 30 minutes with stirring. Then the temperature of the resulting solution was raised at 60° C., 0.3 g of 10%-by-weight sodium sulfite aqueous solution (0.05% by weight based on VP) and 0.3 g of 10%-by-weight tert-butyl hydroperoxide aqueous solution (0.05% by weight based on VP) were added thereto, and the polymerization reaction was initiated. After 3 hours, 1.8 g of 10%-by-weight sodium sulfite aqueous solution (0.3% by weight based on VP) and 1.2 g of 10%-by-weight tert-butyl hydroperoxide aqueous solution (0.2% by weight based on VP) were added, and the polymerization reaction was carried out further for 3 hours. The mole ratio of the water soluble organic peroxide (tert-butyl hydroperoxide) and the sulfite (sodium sulfite) used therein was 1:1. The mole ratio of VP and sodium sulfite added initially is 1:0.0004.

EXAMPLE 2

Ninety grams of VP and 210 g of water were introduced in a separable flask having a capacity of 500 ml, and deoxygenation was carried out by blowing nitrogen thereinto for 30 minutes with stirring. Then 4.5 g of 20%-by-weight ammonium sulfite aqueous solution (1.0% by weight based on VP) and 2.7 g of 10%-by-weight tert-butyl hydroperoxide aqueous solution (0.3% by weight based on VP) were added thereto, and the polymerization reaction was initiated at 30° C.

After 3 hours, the reaction temperature rose to 80° C., and 4.5 g of 10%-by-weight ammonium sulfite aqueous solution (0.5% by weight based on VP) and 4.5 g of 10%-by-weight tert-butyl hydroperoxide aqueous solution (0.5% by weight based on VP) were added, and then, the polymerization reaction was carried out further for 3 hours. The mole ratio of the water soluble organic peroxide (tert-butyl hydroperoxide) and the sulfite (ammonium sulfite) used therein was 1 1.43. The mole ratio of VP and ammonium sulfite added initially is 1:0.01.

EXAMPLE 3

Ninety grams of VP and 190 g of water were introduced in a separable flask having a capacity of 500 ml, and deoxygenated by blowing nitrogen thereinto for 30 minutes with stirring. Then 22.5 g of 20%-by-weight ammonium sulfite aqueous solution (5.0% by weight based on VP) and 2.7 g of 10%-by-weight tert-butyl hydroperoxide aqueous solution (0.3% by weight based on VP) were added thereto, and the polymerization reaction was initiated at 20° C. After 3 hours, the reaction temperature rose to 80° C., and 4.5 g of 10%-by-weight ammonium sulfite aqueous solution (0.5% by weight based on VP) and 4.5 g of 10%-by-weight tert-butyl hydroperoxide aqueous solution (0.5% by weight based on VP) were added, and then, the polymerization reaction was carried out further for 3 hours. The mole ratio of the water soluble organic peroxide (tert-butyl hydroperoxide) and the sulfite (ammonium sulfite) used therein was 1:5. The mole ratio of VP and ammonium sulfite added initially is 1:0.05.

Comparative Example 1

Sixty grams of VP and 240 g of water were introduced in a separable flask having a capacity of 500 ml, and deoxygenation was carried out by blowing nitrogen thereinto for 30 minutes with stirring. Then the temperature of the resulting solution was raised at 60° C., as a polymerization initiator 3.0 g of 10%-by-weight 2,2'-azobis (2-amidinopropane) dihydrochloride aqueous solution (0.5% by weight based on VP) was added thereto, and the polymerization reaction was initiated. After 5 hours, 2.0 g of 30%-by-weight aqueous hydrogen peroxide (1.0% by weight based on VP) and 3 g of 0.01%-by-weight $CuCl_2$ aqueous solution were added thereto, and the polymerization reaction was carried out at 80° C. further for 3 hours.

Comparative Example 2

Ninety grams of VP, 210 g of water and 5 g of 0.01%-by-weight $CuCl_2$ aqueous solution were introduced in a separable flask having a capacity of 500 ml, and deoxygenation was carried out by blowing nitrogen thereinto for 30 minutes with stirring. Then the temperature of the resulting solution was raised at 50° C., 6.0 g of 30%-by-weight aqueous hydrogen peroxide (3.0% by weight based on VP) were added thereto, and the polymerization reaction was initiated. During the polymerization, pH of the polymerization system was kept at 6.0 to 8.0. After 5 hours, 2.0 g of 30%-by-weight aqueous hydrogen peroxide (1.0% by weight based on VP) was added thereto, and the polymerization reaction was carried out at 80° C. further for 3 hours.

Comparative Example 3

Ninety grams of VP, 200 g of water and 2 g of 0.1%-by-weight $CuCl_2$ aqueous solution were introduced in a separable flask having a capacity of 500 ml, and deoxygenation was carried out by blowing nitrogen thereinto for 30 minutes with stirring. Then the temperature of the resulting solution was raised at 70° C., 18 g of 10%-by-weight tert-butyl hydroperoxide aqueous solution (2.0% by weight based on VP) was added thereto, and the polymerization reaction was initiated. After 4 hours, 9 g of 10%-by-weight tert-butyl hydroperoxide aqueous solution (1.0% by weight based on VP) was added thereto, and the polymerization reaction was carried out at 80° C. further for 3 hours.

(Means for Evaluation)

Solids content: about 5 g of the resulting polymer aqueous solution after the polymerization was weighed out precisely, dried at 105° C. for 12 hours. The weight of the evaporation residue was calculated as a solids content.

Hazen No. (APHA): according to JIS K3331, APHA measurement of a polymer aqueous solution adjusted to 10% by weight of a solids content was carried out. The smaller APHA value is, the less coloration is and the better the product is.

Smell: immediately after the polymerization, smell was estimated on the basis of the criterion as follows.
⊚: little smell
○: a little smell
Δ: a bad smell
X: a terrible smell 2-Pyrrolidone: 2-pyrrolidone was separated by a HPLC (high-performance liquid chromatography), and quantified by a measurement of an absorption intensity at 235 nm using a UV detector.

K value: a K value was evaluated as mentioned above.

Remaining VP: a high performance liquid chromatography (HPLC) is performed to evaluate a content of VP remaining in the resulting vinylpyrrolidone polymer based on an absorption intensity at 235 nm.

(Results)

The results of Examples 1 to 3 and Comparative Examples 1 to 3 are shown in Table 1.

TABLE 1

|  | EXAMPLE | | | COMPARATIVE EXAMPLE | | |
| --- | --- | --- | --- | --- | --- | --- |
|  | 1 | 2 | 3 | 1 | 2 | 3 |
| Solids content | 20.2 | 30.3 | 29.2 | 19.6 | 29.0 | 30.1 |
| APHA | 10 | 10 | 10 | 90 | 100 | 90 |
| Smell | ⊚ | ⊚ | ⊚ | Δ | X | Δ |
| 2-Pyrrolidone (% by weight) | 0.02 | 0.17 | 0.22 | 0.90 | 4.77 | 1.27 |
| K value | 93.4 | 31.5 | 19.9 | 89.2 | 17.2 | 28.4 |
| Remaining VP (ppm) | 7.5 | 6.3 | 8.1 | 24 | 65 | 120 |

In Examples 1 to 3 wherein an organic peroxide and a sulfite were employed as a redox initiator, the resulting polymers (aqueous solution thereof) had little coloration and smell, and contained little amount of 2-pyrrolidone as a by-product.

In Comparative Example 1 wherein an azo compound initiator was employed, both tetramethylsuccinimidine and tetramethyl-5-imino-2-pyrrolidone that were decomposed products derived from the polymerization initiator were detected by using HPLC. Further, compared with Examples 1 to 3, coloration and smell were strong.

In both Comparative Example 2 wherein hydrogen peroxide was employed as a polymerization initiator and Comparative Example 3 wherein tert-butyl hydroperoxide was employed singly as a polymerization initiator, coloration and smell were strong and a larger amount of 2-pyrrolidone were produced as a by-product, compared with Examples 1 to 3.

Industrial Applicability

According to the process for the preparation of a vinylpyrrolidone polymer of the present invention, a vinylpyrrolidone polymer which has little coloration and smell in a form of aqueous solution and contains little impurities can be obtained. The polymerization can be carried out at a low temperature because a redox initiator is employed. And the molecular weight (K value) can be easily regulated by regulating the amount of a sulfite added initially.

What is claimed is:

1. A process for preparing a vinylpyrrolidone polymer, wherein a water-soluble organic peroxide and a sulfite are added to a vinylpyrrolidone aqueous solution to polymerize vinylpyrrolidone, and to obtain a vinylpyrrolidone polymer, and the mole ratio of the water-solution organic peroxide and the sulfite is 1:1 to 1:10.

2. The process for preparing a vinylpyrrolidone polymer of claim 1, wherein a K value of the resulting vinylpyrrolidone polymer evaluated according to Fikentscher method is 10 to 120.

3. The process for preparing a vinylpyrrolidone polymer of claim 1, wherein the water-soluble organic peroxide is added in an amount of 0.005 to 5% by weight and the sulfite is added in amount of 0.005 to 10% by weight based on the vinylpyrrolidone.

4. The process for preparing a vinylpyrrolidone polymer of claim 1, wherein the water-soluble organic peroxide and the sulfite are added to the reaction solution in installments for the polymerization.

5. The process for preparing a vinylpyrrolidone polymer of claim 4, wherein the amount of the sulfite added initially is determined so that the mole ratio of the vinylpyrrolidone and the sulfite added initially is 1:0.0004 to 1:0.1.

6. The process for preparing a vinylpyrrolidone polymer of claim 1, wherein the polymerization temperature of vinylpyrrolidone is 10 to 90° C.

7. The process for preparing a vinylpyrrolidone polymer of claim 1, wherein the sulfite is ammonium sulfite.

8. The process for preparing a vinylpyrrolidone polymer of claim 1, wherein the water-soluble organic peroxide is a hydroperoxide.

9. The process for preparing a vinylpyrrolidone polymer of claim 1, wherein the water-soluble organic peroxide is tert-butyl hydroperoxide.

10. The process for preparing a vinylpyrrolidone polymer of claim 1, wherein at most 10 ppm of vinylpyrrolidone is contained in the resulting vinylpyrrolidone polymer.

11. A vinylpyrrolidone polymer containing small amounts of vinylpyrrolidone, which is obtained by adding a water-soluble organic peroxide and a sulfite to a vinylpyrrolidone aqueous solution to polymerize vinylpyrrolidone, wherein the mole ratio of the water-soluble organic peroxide and the sulfite is 1:1 to 1:10.

12. The vinylpyrrolidone polymer of claim 11, which contains at most 10 ppm of vinylpyrrolidone based on the vinylpyrrolidone polymer.

13. The vinylpyrrolidone polymer of claim 11, which has a K value evaluated according to Fikentscher method of 10 to 40, and Hazen No. (APHA) value in a 10% aqueous solution according to JIS K3331 of at most 10, and which contains at most 10 ppm of remaining vinylpyrrolidone based on the vinylpyrrolidone polymer.

* * * * *